United States Patent [19]
Baatz et al.

[11] 4,120,518
[45] Oct. 17, 1978

[54] CARBONLESS COPYING PAPERS

[75] Inventors: Günther Baatz, Cologne; Manfred Dahm, Leverkusen; Kurt Triebeneck, Cologne, all of Germany

[73] Assignee: Bayer Aktiengesellschaft, Germany

[21] Appl. No.: 788,771

[22] Filed: Apr. 19, 1977

[30] Foreign Application Priority Data

Apr. 23, 1976 [DE] Fed. Rep. of Germany ....... 2617747

[51] Int. Cl.$^2$ ............................................. B41M 5/22
[52] U.S. Cl. .................... 282/27.5; 252/316;
427/150; 427/151; 428/307; 428/476; 428/914
[58] Field of Search ........................ 252/316; 282/27.5;
427/150, 151; 428/306, 307, 323, 327, 411, 474,
475, 476, 537, 913, 914; 106/21

[56] References Cited

U.S. PATENT DOCUMENTS

| 3,450,562 | 6/1969 | Hoeschele | 428/476 |
| 4,000,087 | 12/1976 | Maalouf | 252/316 |
| 4,021,595 | 5/1977 | Kiritani et al. | 428/307 |

Primary Examiner—George F. Lesmes
Assistant Examiner—Bruce H. Hess
Attorney, Agent, or Firm—Connolly and Hutz

[57] ABSTRACT

Carbonless copying papers of which the donor layer contains microcapsules of a solution of dyestuff precursors in organic solvents as core material and polycarbodiimides as shell material.

5 Claims, No Drawings

CARBONLESS COPYING PAPERS

This invention relates to carbonless copying papers and, in particular, to carbon papers having a colour forming layer containing microcapsules.

The concept of carbonless copying papers is as follows: Two (or more) sheets of paper are placed on top of each other. The upper sheet contains a donor layer on its reverse side and the lower sheet contains a receiving layer on its front side with the donor layer and receiving layer in contact with one another. The donor layer contains microcapsules of which the core material is a solution of a dyestuff precursor in an organic solvent, and the receiving layer contains a compound which develops the dyestuff precursor to form the dye. Upon writing, the capsules burst open under the pressure of the writing instrument and the outflowing core material runs onto the receiving layer so that a copy is produced. The receiving layer, generally, contains binders and pigments, for example active absorbents, such as kaolin, attapulgite, montmorillonite, bentonite, acid fuller's earth or phenolic resins. The donor layer may, for example, contain acid-activatable dyestuff precursors and the receiving layer an acidic component.

Carbonless copying papers are already known (cf.: M. Gutcho, Capsule Technology and Microencapsulation, Noyes Data Corporation, 1972, pages 242–277).

The grade of carbonless copying papers is determined by the microcapsules of the donor layer which contain the dyestuff precursor solution. The shell of the capsule has to be impervious to the dyestuff precursor solution so that the solvent does not evaporate, otherwise the shelf life of the paper is reduced. The shells have to break open easily under the pressure of the typewriter keys and, for this reason, should not be too thick.

Processes for producing microcapsules for reactive carbon papers include inter alia phase separation processes and phase interface polymerisation processes.

One typical phase separation process is coacervation and complex coacervation. In this process, a polymer coacervate is deposited at the phase interface by adjusting the correct temperature and the correct pH-value and can, subsequently, be hardened.

According to German Auslegeschrift No. 1,122,495, gelatin serving as a wall material which is insoluble in the oily core material, for example in a chlorinated diphenyl and the dissolved colour former, but soluble in the continuous aqueous phase is deposited from the aqueous phase at the interface to the liquid oily core material by complex coacervation with gum arabic, and subsequently crosslinked with aldehydes.

This process has a number of disadvantages. As the properties of natural colloids are not standardized coacervation conditions, such as temperature and pH-value, have to be continually adjusted. Accordingly, the process cannot be carried out continuously. Also, deposition of the gelatin from the aqueous phase is incomplete. During the subsequent crosslinking reaction with aldehydes, the residues of gelatin left in the water form swollen particles which seriously interfere with further processing. As a result of agglomeration, microcapsule units with an undesirably wide particle size distribution are obtained. Salts and water-miscible solvents can be added to improve precipitation of the gelatin, but unfortunately this necessitates processing of the aqueous phase for ecological reasons.

German Offenlegungsschrift No. 2,119,933 and No. 2,237,545 describe an encapsulating process in which a wall material containing hydrophilic and hydrophobic groups is dissolved in a mixture of readily volatile solvents which dissolve the wall material and substantially involatile water-insoluble organic liquids which form the core material. The mixture is dispersed in water and the solvent is evaporated. The shell-forming copolymer is subsequently crosslinked by aldehydes, especially, formaldehyde.

Both processes have disadvantages. Thus, despite crosslinking, the wall material is soft enough at temperatures about 50° C. that after application to the surface of the paper and during the subsequent drying process at elevated temperatures, the capsules can easily be destroyed by additional mechanical stress. This leads to defective or even unusable papers.

The present invention relates to reactive carbon papers of which the donor layer contains microcapsules of a solution of colour formers in organic solvents as core material and polycarbodiimides as shell material.

Suitable film-forming polycarbodiimides contain in one and the same molecule a plurality of units

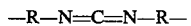

where R represents alkylene, cycloalkylene, arylene or substitution products thereof;

the terminal groups may be isocyanate groups.

These polymers afford decisive advantages in the microencapsulation of colour former solutions for reactive carbon papers.

Thus, solutions of film-forming polycarbodiimides can be applied in the evaporation process and in the reactive process. Polycarbodiimides containing free isocyanate groups are best processed by the reactive process. This process takes place fairly quickly at the phase interface so that it has a high volume-time yield. In addition, both processes are very easy to carry out continuously.

Polycarbodiimides are available with widely varying properties, depending on the polyisocyanates or mixtures of polyisocyanates they are made from.

Thus for many core materials, for example, many colour former solutions, a suitable polycarbodiimide shell material can be found. For example, if the core material is hydrophilic, the shell-forming polymers have to be hydrophobic. Conversely, if the core material is hydrophobic, the shell-forming polymers have to be hydrophilic. The permeability of the shell to the material to be encapsulated has an important bearing upon the choice of the shell material. In general, the core material and shell-forming polymer should have opposite solubility parameters (for example, hydrophobic shell polymers are, generally, less permeable to hydrophilic encapsulated materials than to hydrophobic encapsulated materials). However, sometimes a suitable shell-forming polymer is not available for a given core material. In such cases, two polymer shells of different polymers may be produced one on top of the other. Alternatively, the polycarbodiimide shells can be modified by further chemical reactions, e.g., by introducing carboxyl groups or amino groups. Thus, the linear polycarbodiimide chains can be crosslinked in a separate step by reaction with dicarboxylic acids, e.g., adipic acid, or a second shell can be applied which is chemically joined to the first shell by reaction with the amino and carboxyl groups of gelatin (or similar hydrophilic polymers) by the methods of coacervation and complex coacervation. It is also possible to make the basically hydrophobic polycarbodiimide more hydrophilic by reaction with low molecular weight reactants.

Microcapsules of polycarbodiimides do not agglomerate due to a complete reaction. This is surprising, as it is observed not only with large microcapsules, but also with those of around 10 μm diameter which are of interest for reactive carbon papers.

Suitable polymeric carbodiimides include aromatic, aliphatic cycloaliphatic and aliphatic-aromatic polycarbodiimides and mixtures thereof.

Polycarbodiimides can be produced from the corresponding isocyanates, for example, 2,4- and 2,6-diisocyanato-toluene or their isomeric mixtures (such as a mixture consisting of 80% of 2,4- and 20% of 2,6-diisocyanato-toluene); 4,4'-diisocyanatodiphenyl methane; phosgenation products of acid-catalysed aniline-formaldehyde condensates; 1,3-diisocyanatobenzene; 1,3,5-trimethyl and 1,3,5-triisopropyl benzene-2,4-diisocyanate; 1,6-diisocyanatohexane and 1-isocyanato-3,3,5-trimethyl-5-isocyanatomethyl cyclohexane. Undistilled polyisocyanate precursors and reaction products of polyisocyanates with monoalcohols or polyalcohols in an NCO:OH-ratio of greater than 1, and modified polyisocyanates are also suitable. Modified polyisocyanates are polyisocyanates which additionally contain biuret, allophanate, isocyanurate and even carbodiimide groups.

All these isocyanates can be used singly or as mixtures of different isocyanates.

For microencapsulation by the evaporation process and by the reactive process, the polycarbodiimides have to be soluble in waterimmiscible solvents which are inert to isocyanate and carbodiimide groups. Solvents used in the evaporation process must have boiling points below that of water or must form an azeotrope with water and/or another solvent, so that they can be removed.

Polycarbodiimides useful in the invention preferably contain free terminal isocyanate groups, i.e. have the following idealised structure:

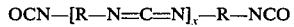

OCN—[R—N=C=N]$_x$—R—NCO in which R represents alkylene, cycloalkylene and arylene and $x$ is an integer from 2 to 40, and wherein part of the functional carbodiimide and/or isocyanate groups can be present as uret dione or uretone imine groups as a result of dimerisation. R is preferably a $C_2$-$C_6$-alkylene, $C_5$-$C_7$-cycloalkylene or a $C_6$-$C_{12}$-arylene radical.

A catalyst used for polymerisation of the polyfunctional isocyanates contains the phospholinimino group which may be present in the system, e.g., in the form of idealised compound.

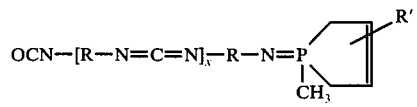

in which $x$ and R have the same meanings as above and R' is an alkyl or a cycloalkyl group. R' preferably is alkyl with 1 to 6 carbon atoms and cycloalkyl with 5 to 7 carbon atoms.

Polycarbodiimides based on tolylene diisocyanate and hexamethylene diisocyanate are preferred.

The production of polycarbodiimides is known and is described, for example, in Encyclopedia of Polymer Science and Technology, Vol. 7, pages 751–754. The simplest procedure is to add phospholine oxides to the isocyanates and to comminute the resulting foam-like material.

Dyestuff precursors to be used in this invention are substantially colourless compounds containing various chromophoric groups. They are converted into the dyestuffs by acids. Examples are bis-(p-aminoaryl)-phthalides, leucoauramines, acylauramines, α,β-unsaturated aryl ketones, basic monoazo dyes, Rhodamin-B-lactams, such as the N-(p-nitrophenyl)-Rhodamin-B-lactams, polyaryl carbinols and reaction products thereof, i.e. esters or ethers substituted by amino groups and various heterocyclic spiranes. Preferred compounds are 3,3-bis-(p-dimethylaminophenyl)6-dimethylaminophthalide ("crystal violet lactone") and N-benzoyl leucomethylene blue.

The polycarbodiimides are dissolved in suitable solvents or solvent mixtures. Suitable solvents are aromatic hydrocarbons and halogenated aromatic hydrocarbons. Examples are chlorinated diphenyls, dodecyl benzene and terphenyls, diisopropyl benzene, benzoic acid ethyl ester, aralkyl or diaryl ethers, xylenes or the aromatic mixtures sold as "Solvent naphtha" and "Solvesso."

For microencapsulation by the reactive process, the polycarbodiimide can be initially dissolved in an inert solvent, and the dyestuff precursor is, subsequently, dissolved in the resulting solution.

If necessary, somewhat readily volatile co-solvents, such as methylene chloride or chloroform, are added. In a shear gradient (preferably produced by intensive mixing in small mixing gears) this solution is introduced into an immiscible liquid phase, e.g., water which contains an isocyanate-reactive polyamine.

The amine may also be added after dispersion.

Suitable polyamines are, for example, 1,2-ethylene diamine, bis-(3-aminopropyl)-amine, hydrazine, hydrazine-2-ethanol, bis-(2-methylaminoethyl)-methylamine, 1,4-diamino-benzene, 4,4'-diaminodiphenyl methane, 1,4-diaminocyclohexane, 3-amino-1-methylaminopropane, N-hydroxyethyl ethylene diamine, N-methyl-bis-(3-aminopropyl)-amine, 1,4-diamino-n-butane, 1,6-diamino-n-hexane, 1,2-ethylene diamine-N-ethane sulphonic acid (in the form of an alkali salt).

In another embodiment of this process, small quantities of water-soluble catalysts for isocyanate reactions are used instead of the isocyanate-reactive polyamines. Examples are amine catalysts used in the production of polyurethanes, such as N-methylmorpholine, 1,4-diaza-(2,2,2)-bicyclooctane or N-methyl-N'-dimethylaminoethyl piperazine. Organic and inorganic bases may be used in the same way as catalysts. Examples are alkali hydroxides, -formiates, -acetates, -borohydrides, -phenolates and -phenolates with additional tertiary amino groups, such as 2,4,6-tris(dimethylaminomethyl)-phenolates as well as aliphatic and aromatic ammonium salts. Catalytic amounts of these components suffice. In general, from 0.1 to 0.5 part by wt. of the catalyst is required per 100 parts by wt. of dispersant.

When the evaporation process is applied, the polycarbodiimide is initially dissolved in a solvent or solvent mixture which has a boiling point below 100° C. or which forms an azeotrope boiling below 100° C. The compatible dyestuff precursors are then added to and dissolved in the resulting solution. The resulting mixture is then dispersed with vigorous stirring into a liquid phase which is immiscible with the polymer solvent, for example, water after which the mixture is slowly heated to temperatures above the boiling point of the polymer solvent or azeotrope. The solvent evaporates and the polycarbodiimide envelopes the dyestuff precursor solution used as inner phase at the phase interface. Emulsifiers and/or protective colloids can be added to the aqueous phase to improve emulsification and stabilisation. Examples of protective colloids are carboxymethyl cellulose, gelatin and polyvinyl alcohol; examples of emulsifiers are ethoxylated 3-benzyl-4-hydroxybiphenyl and reaction products of nonyl phenol with various quantities of ethylene oxide.

The polycarbodiimide shell can be modified: For example, a second shell can be added, or the carbodiimide groups can be reacted with suitable compounds such as polyamines, e.g., those mentioned above, for additional hardening, or, in a separate step, with polyfunctional carboxylic acids, e.g., adipic acid, polyacrylic acid or their copolymers.

Hardening agents may be added to the outer phase during preparation of the dispersion. However, they may also be introduced after formation of the microcapsules, optionally in the form of a solution in a solvent compatible with the outer phase.

The microcapsules can be produced continuously or in batches. In the production, dispersion machines generating a shear gradient are preferably used. Examples of such machines are blade stirrers, basket stirrers, high speed stirrers, colloid mills, homogenisers, ultrasonic dispersers, nozzles, jets, and Supraton machines. The intensity of the turbulence generated during mixing governs the diameter of the microcapsules obtained, which ranges from 1 to 2000 $\mu$m. Preferred microcapsules for producing carbon papers have diameters from 2 to 20 $\mu$m. The capsules obtained do not agglomerate and have a narrow particle size distribution.

The ratio by weight of core material to shell material in the completed microcapsules is generally from 50:90 to 50:10.

The pressure-sensitive carbon papers are produced by conventional methods as described in detail in Capsule Technology and Microencapsulation by M. Gutcho, Noyes Data Corp., 1972, pages 242–277.

The microcapsule suspensions may conveniently be produced with a capsule content of from 10 to 35% by weight and they exhibit a tendency to cream as long as they do not contain a binder. This can be utilised for concentrating the suspension. The most preferred capsule size is of the order of 10 $\mu$m. The homogenised capsule suspensions provided with binder and, optionally, other inert fillers, such as talcum and kaolin, are applied to untreated paper (40–100 g/m$^2$) in quantities of from 4 to 8 g/m$^2$ either manually by means of a doctor blade or mechanically by means of an air brush. The coating of untreated papers and the production of receiving papers is described in detail in German Offenlegungsschrift No. 1,934,457 and No. 1,955,542. After drying and further processing, the papers thus coated serve as the donor component (first sheet). In multiple carbon sets, the following sheets have to carry a receiving coating on the upper and a donor coating on the reverse side. To produce papers coated on both sides the above described capsule suspensions can be used when they are neutralised and (as a result of neutralisation) do not contain significant quantities of amine salts. Standard commercial-grade receiving paper can be used and its reverse side can be coated with a donor layer.

To this end, the optionally neutralised aqueous capsule suspension washed free from salts has binder and, optionally, inert filler added to it and is directly used to coat the surface of the papers. Known coating processes are suitable. Binders are, for example, natural products such as starch, vegetable gums or animal glues, semi-synthetic products such as cellulose esters and cellulose ethers and synthetic products such as latices based on polyurethanes, polyacrylic acid esters or rubber polymers, also water-soluble-polymers, such as polyacrylamide or polyvinyl alcohol.

EXAMPLE 1

(a) Production of the polymer (H-PCD)

134 g of hexamethylene-1,6-diisocyanate were mixed with 2 g of 1-methyl phospholine-1-oxide, and the resulting mixture was heated at 50° C. for 15 hours. An extremely viscous product was formed with gradual elimination of carbon dioxide. This product is soluble in the following solvents: methylene chloride, chloroform, chlorobenzene, toluene, diphenyl ether, solvent naphtha, Clophen A 30, tri-n-butyl phosphate, trichloroethyl phosphate, ethylene chloride, 1,3-dichloropropane, cyclohexane, methylethyl ketone, acetone, ethylacetate, pyrrolidone, N-methyl pyrrolidone, dimethyl formamide, benzene and a number of other aromatic and araliphatic hydrocarbons, dioxane tetrahydrofuran. The polycarbodiimide should be stored at temperatures below 5° C.

(b) Encapsulation 0.8–1.2 g of crystal violet lactone were dissolved with stirring and heating to approximately 70° C. in 25 g of solvent naphtha (aromatic mixture of xylene, cumene, toluene and other naphthalene oils produced by BV Aral). After the solution had been cooled, 5 g of the polycarbodiimide based on 1,6-diisocyanato-n-hexane (H-PCD) described in Example 1a were added and dissolved.

The homogeneous mixture was then dispersed in 300 ml of water containing 1.5 g of carboxymethyl cellulose (CMC) as emulsification aid. A Kotthoff mixing siren (6500 rpm, 1 l glass beaker, approx. 10 seconds) was used for dispersion. A solution of 44 g of ethylene-1,2-diamine-N-ethane sulphonic acid (in the form of the sodium salt) in 94 g of water was then added under the same dispersion conditions. After about one min. the dispersion machine was then replaced by a simple laboratory stirrer of the Lenart-Rapid type (500 rpm). The mixture was quickly heated to 60° C. with constant stirring and kept at that temperature for about 1 hour. The heating phase was used to develop as stable a shell as possible. The diameter of the capsules obtained was of the order of 10 to 20 $\mu$m.

EXAMPLE 2

The organic phase to be dispersed was prepared as described in Example 1b. However, 0.5 g of N-benzoyl leucomethylene blue was additionally added. A 20 to 100 fold quantity of this mixture was dispersed in water by means of a Supraton mixer (1500 rpm). The quantitative ratios between the components were the same as described in Example 1b. In this case, however, the organic phase, the amine and water were added through metering pumps.

In a variant, the CMC was replaced by a similar quantity of polyvinylalcohol (Moviol 70/98), in addition to which 1.4g of ethylene diamine were used as amine to 5g of H-PCD. The diameter of the capsules obtained was of the order of 5 to 25 μm.

EXAMPLE 3

Production of the polycarbodiimide (H-PCD) and the encapsulation of solvent naphtha and crystal violet lactone as core materials was carried out as described in Example 1a) and 1b), respectively, with the following modification: the "amine component" was N-methyl-N'-dimethylaminoethyl piperazine (0.5 g) as catalyst for reacting functional isocyanate groups in the H-PCD.

1 to 2 hours' aftertreatment at 80° C. while stirring with a laboratory stirrer (Lenart-Rapid) at 500 rpm is recommended for this purpose. The diameter of the capsules obtained was of the order of ≧ 10 μm.

EXAMPLE 4

The procedure is as in Example 1(a) and 1(b), respectively, with the following modification:

25 g of Solvesso 100 (an aromatic mixture produced by Esso AG), 1.0 g of crystal violet lactone and 0.5 g of N-benzoyl leucomethylene blue were used as core material. The amine component was ethylene diamine (14 g) in water (56 g). 1.5 g of polyvinyl alcohol (Moviol 70/98) was added as emulsification aid to the aqueous phase (300 ml).

The diameter of the capsules obtained was of the order of 10 to 20 μm.

EXAMPLE 5

(a) Production of the polymer (T 80-PCD)

139 g of a mixture of 80% by weight of 2,4-diisocyanatotoluene and 20% by weight of 2,6-diisocyanatotoluene were mixed with stirring at room temperature with 2 g of 1-methyl phospholine-1-oxide. The mixture foams slowly and, after 12 hours, gave a friable polycarbodiimide foam which dissolved in such solvents as methylene chloride, chloroform, chlorobenzene, o-dichlorobenzene, toluene, tetrahydrofuran, N-methyl pyrrolidone and dimethyl formamide. The reaction product softened at temperatures above 200° C. It is advisable to store the polycarbodiimide at temperatures below 5° C. in order as far as possible to suppress the further reaction.

(b) Encapsulation 1.2 g of crystal violet lactone were dissolved in 25 g of chlorobenzene. 4 g of the polycarbodiimide described in Example 5(a) were added to and dissolved in the resulting solution. The homogeneous mixture was dispersed in 300 ml of water containing 1.5 g of polyvinyl alcohol (Moviol 70/98) as emulsification acid. The dispersion conditions and aftertreatment were the same as described in Example 1(b).

The amine component was ethylene diamine (14 g) in water (56 g). The capsule diameter was of the order of 10 to 25 μm.

EXAMPLE 6

1.0 g of crystal violet lactone was dissolved in 20 g of diphenyl ether which had to be heated for this purpose (m.p. 28° C.). A solution of 6 g of chloroform and 5 g of the T 80-PCD described in Example 5a) was then added. The chloroform acts as solution promoter because the polymer is inadequately soluble in diphenyl ether. The homogeneous mixture was dispersed in 300 ml of water which contained 1.5 g of dissolved polyvinyl alcohol (Moviol 70/98) as emulsification aid. Dispersion and aftertreatment were carried out in the same way as described in Example 1b) the chloroform used evaporates quantitatively. The amine component was ethylene diamine(14 g) in water (56 g). The capsules obtained had a diameter of the order of 10 to 30 μm.

EXAMPLE 7

0.8 to 1.2 g of crystal violet lactone were dissolved in 25 g of Solvent naphtha with stirring and heating to about 70° C. After the solution has been cooled, 5 g of Desmodur N ® (a commercial product of Bayer AG, Leverkusen: an oligomerisation product of 1,6-diisocyanato-n- hexane containing biuret groups) were then added and dissolved. The homogeneous mixture was dispersed in 300 ml of water which contains 1.5 g of polyvinyl alcohol (Moviol 70/98) as emulsification aid. Dispersion conditions were the same as described in Example 16). A solution of 14 g of ethylene diamine in 56 g of water was then added.

The dispersion machine was then replaced by a simple laboratory stirrer of the Lenart-Rapid type (500 rpm). The mixture was quickly heated to 60° C. with constant stirring and kept at that temperature for about 1 hour. The diameter of the capsules obtained was of the order of 5 to 25 μm.

What we claim is:

1. A paper sheet containing a donor layer comprising a plurality of microcapsules containing, as core material, a solution of at least one dyestuff precursor in an organic solvent and, as encapsulating material, at least one polycarbodiimide which contains a plurality of units of the formula —R—N=C=N—R— wherein R is alkylene, cycloalkylene, arylene or a substitution product thereof.

2. The paper sheet of claim 1 wherein the terminal groups of the polycarbodiimide are isocyanate groups.

3. The paper sheet of claim 1 wherein the polycarbodiimide is based on tolylene diisocyanate or hexamethylene diisocyanate.

4. The paper sheet of claim 1 wherein said dyestuff precursor is 3,3-bis-(p-dimethylaminophenyl)-6-dimethylaminophthalide or N-benzoyl leucomethylene blue.

5. A reactive carbon paper comprising at least two sheets of which an upper sheet contains a donor layer on the reverse side and a lower sheet contains a receiving layer on the front side, said donor layer and receiving layer being in contact and said donor layer comprising a plurality of microcapsules containing, as core material, a solution of at least one dyestuff precursor in an organic solvent and, as encapsulating material, at least one polycarbodiimide which contains a plurality of units of the formula —R—N=C=N—R— wherein R is alkylene, cycloalkylene, arylene or a substitution product thereof.

* * * * *